US011173894B2

(12) United States Patent
Park et al.

(10) Patent No.: US 11,173,894 B2
(45) Date of Patent: Nov. 16, 2021

(54) INTEGRATED CHASSIS CONTROL METHOD BASED ON STABILITY AFTER AVOIDANCE AND VEHICLE USING THE SAME

(71) Applicants: Hyundai Motor Company, Seoul (KR); Kia Motors Corporation, Seoul (KR)

(72) Inventors: Jae-Il Park, Seoul (KR); Sung-Wook Hwang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 496 days.

(21) Appl. No.: 16/205,046

(22) Filed: Nov. 29, 2018

(65) Prior Publication Data
US 2019/0184978 A1    Jun. 20, 2019

(30) Foreign Application Priority Data

Dec. 15, 2017    (KR) .................. 10-2017-0173372

(51) Int. Cl.
*B60W 10/00* (2006.01)
*B60W 30/02* (2012.01)
*B60W 10/119* (2012.01)
*B60W 10/18* (2012.01)
*B60W 10/20* (2006.01)
*B60W 10/22* (2006.01)
(Continued)

(52) U.S. Cl.
CPC ........... *B60W 30/02* (2013.01); *B60T 8/1755* (2013.01); *B60T 8/17558* (2013.01); *B60W 10/119* (2013.01); *B60W 10/18* (2013.01); *B60W 10/20* (2013.01); *B60W 10/22* (2013.01); *B60W 30/09* (2013.01); *B62D 6/00* (2013.01); *B62D 7/159* (2013.01); *B62D 15/025* (2013.01); *B62D 15/0265* (2013.01); *B60T 2260/02* (2013.01); *B60T 2260/022* (2013.01); *B60T 2260/06* (2013.01); *B60W 2520/10* (2013.01); *B60W 2520/125* (2013.01); *B60W 2520/14* (2013.01); *B60W 2540/18* (2013.01); *B60W 2554/00* (2020.02); *B60W 2710/18* (2013.01); *B60W 2710/20* (2013.01); *B60W 2710/22* (2013.01)

(58) Field of Classification Search
None
See application file for complete search history.

(56) References Cited

U.S. PATENT DOCUMENTS 7,164,980 B1    1/2007  Doll
7,734,418 B2 *  6/2010  Shoda ................. G08G 1/163
                                                      701/301
(Continued)

FOREIGN PATENT DOCUMENTS

JP    2016-515974 A    6/2016
KR    10-2014-0033274 A    3/2014
(Continued)

*Primary Examiner* — James M McPherson
(74) *Attorney, Agent, or Firm* — Morgan, Lewis & Bockius LLP

(57) ABSTRACT

An integrated chassis control method may include stability control after avoidance performing stability steering assist control after avoiding a forward collision situation by avoidance steering assist control when the forward collision situation is verified by an integrated chassis controller.

17 Claims, 9 Drawing Sheets

(51) Int. Cl.
  *B62D 15/02* (2006.01)
  *B62D 6/00* (2006.01)
  *B60T 8/1755* (2006.01)
  *B60W 30/09* (2012.01)
  *B62D 7/15* (2006.01)

(56) References Cited

U.S. PATENT DOCUMENTS

| | | |
|---|---|---|
| 2002/0042671 A1 | 4/2002 | Chen |
| 2014/0244142 A1* | 8/2014 | Matsubara ............ B60W 10/20 |
| | | 701/116 |
| 2014/0244151 A1* | 8/2014 | Matsubara .......... B60W 30/095 |
| | | 701/301 |
| 2015/0283999 A1* | 10/2015 | Igarashi ................ G08G 1/165 |
| | | 701/1 |
| 2016/0244055 A1 | 8/2016 | Wolf |
| 2017/0029026 A1* | 2/2017 | Okuda .................. B60W 30/09 |
| 2019/0100197 A1* | 4/2019 | Saiki ..................... B60W 30/09 |

FOREIGN PATENT DOCUMENTS

| | | |
|---|---|---|
| KR | 10-2016-0109285 A | 9/2016 |
| KR | 10-2017-0049927 A | 5/2017 |
| KR | 10-2017-0099587 A | 9/2017 |
| KR | 10-2017-0109806 A | 10/2017 |

* cited by examiner

| CONTROL SITUATION | | ECS | MDPS | ESC | AWD | RWS |
|---|---|---|---|---|---|---|
| EMERGENCY 1 | DRIVER STEERING Y | FRONT WHEEL : SOFT / REAR WHEEL : HARD | STEERING ASSIST MODE 1 | CONTROL X | TORQUE DISTRIBUTION SUPPRESSION | AVOIDANCE CONTROL |
| | DRIVER STEERING N | FRONT WHEEL : HARD / REAR WHEEL : HARD | ↑ | ↑ | NORMAL CONTROL | CONTROL X |
| EMERGENCY 2 | DRIVER STEERING Y | FRONT WHEEL : SOFT / REAR WHEEL : HARD | STEERING ASSIST MODE 2 | ↑ | TORQUE DISTRIBUTION SUPPRESSION | AVOIDANCE CONTROL |
| | DRIVER STEERING N | FRONT WHEEL : HARD / REAR WHEEL : HARD | ↑ | ↑ | NORMAL CONTROL | CONTROL X |
| EMERGENCY 3 | DRIVER STEERING Y | FRONT WHEEL : SOFT / REAR WHEEL : HARD | ↑ | TURNING INNER RING CONTROL | TORQUE DISTRIBUTION SUPPRESSION | AVOIDANCE CONTROL |
| | DRIVER STEERING N | FRONT WHEEL : HARD / REAR WHEEL : HARD | ↑ | CONTROL X | NORMAL CONTROL | CONTROL X |
| EMERGENCY 4 | SLOW COUNTER STEER | FRONT WHEEL : HARD / REAR WHEEL : SOFT | STABILITY ASSIST MODE 1 | ENGINE TORQUE REDUCTION CONTROL | NORMAL CONTROL | STABILITY CONTROL |
| | FAST COUNTER STEER | | | TURNING OUTER RING CONTROL | TORQUE DISTRIBUTION INCREASE | STABILITY CONTROL |

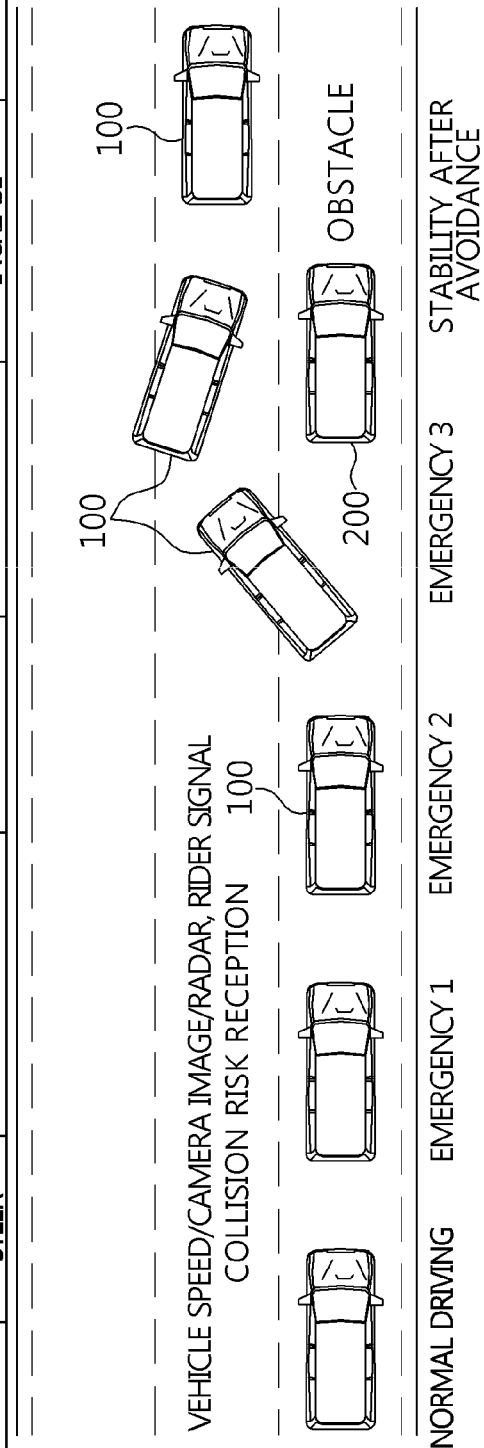

FIG. 3

INTEGRATED CHASSIS CONTROL METHOD BASED ON STABILITY AFTER AVOIDANCE AND VEHICLE USING THE SAME

CROSS-REFERENCE(S) TO RELATED APPLICATIONS

The present application claims priority to Korean Patent Application No. 10-2017-0173372, filed on Dec. 15, 2017, the entire contents of which is incorporated herein for all purposes by this reference.

BACKGROUND OF THE INVENTION

Field of the Invention

The present invention relates to integrated chassis control; and, particularly, to enhancement of collision avoidance assist performance using a chassis system (e.g., RWS/ESC/ECS/MDPS/AWD) when a driver steers for avoidance by detecting a forward collision risk.

Description of Related Art

In general, the integrated chassis control for a vehicle is to control individual chassis systems such as an electronic control suspension (ECS), a motor driven power steering (MDPS), an electronic stability control (ESC), and an all wheel drive (AWD).

Here, the ECS is an electronic suspension system that controls front and rear wheel dampers about the tendency of oversteer/understeer of the vehicle. The MDPS is an electric power steering system that controls assist torque gains about lateral avoidance for improving steering response. The ESC is a vehicle stability system that controls torque vectoring about the tendency of oversteer/understeer. The AWD is a vehicle stability system that controls torque distribution to front and rear wheel about the tendency of oversteer/understeer.

Accordingly, the integrated chassis control generates a significant synergy effect compared to individual control by integrally controlling the ECS, MDPS, ESC, and AWD against unstable vehicle behavior, greatly enhancing riding and handling (R&H) performance while optimizing vehicle stability.

Furthermore, in recent years, the importance of the integrated chassis control has been expanded to avoidance behavior stability against forward collision risk beyond turning behavior.

By way of example, the collision avoidance control of the integrated chassis control is a method of resolving the risk of collision with forward vehicles (or forward objects) by controlling each of the MDPS, the ESC, and the AWD to the ECS when detecting the forward collision risk.

The integrated chassis control should be effectively implemented such that the vehicle has necessary lane keeping performance after forward collision avoidance. However, this existing integrated chassis control may not implement the above effect since it focuses on forward collision avoidance.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an integrated chassis control method based on stability after avoidance, configured for significantly improving vehicle stability control by performing integrated chassis control after forward collision avoidance to rendering lane keeping performance effective, using a rear wheel steering (RWS), together with an ECS, an MDPS, an ESC, and an AWD, as a chassis system, and a vehicle using the same.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, an integrated chassis control method may include stability control after avoidance performing stability steering assist control after avoiding a forward collision situation by avoidance steering assist control when the forward collision situation is verified by an integrated chassis controller.

The stability control after avoidance may be reflected when driver's steering is performed.

The stability control after avoidance may be divided into steering avoidance division control for dividing the avoidance steering assist control into a plurality of stage steering avoidances when recognizing a forward collision risk situation, avoidance-section integrated chassis control including a plurality of stage avoidance steering assist controls matching the plurality of stage steering avoidances, and stabilization-section integrated chassis control including a plurality of stage stability steering assist controls matching the plurality of stage avoidance steering assist controls.

The steering avoidance division control may be performed by detecting vehicle information, determining the forward collision risk situation from the vehicle information, detecting a steering wheel operation in the forward collision risk situation, and dividing the plurality of stage steering avoidances by a steering avoidance rank when the steering wheel operation is detected.

A steering angular speed, a steering angle, a yaw rate, a vehicle speed, and a lateral acceleration may be used to determine the forward collision risk situation. For the determination of the forward collision risk situation, thresholds are applied to the steering angular speed, the steering angle, the yaw rate, the vehicle speed, and the lateral acceleration. The forward collision risk situation is when the thresholds of the steering angular speed, the steering angle, the yaw rate, the vehicle speed, and the lateral acceleration are all satisfied. When the steering wheel operation is detected, a collision avoidance signal may be generated by generation of an emergency flag, and the plurality of stage steering avoidances may be divided by the emergency flag.

The avoidance-section integrated chassis control may include performing avoidance steering assist control selected from the plurality of stage avoidance steering assist controls, and completing the avoidance steering assist control relating to the selected avoidance steering assist control.

In the selected avoidance steering assist control, front- and rear-wheel damping force control may be performed by an ECS, steering assist control may be performed by an MDPS, braking control may be performed by an ESC, control may be performed by an RWS, and a torque distribution control may be performed by an AWD.

The completion of the avoidance steering assist control is determined based on a steering angular speed, a steering angle, a yaw rate, a vehicle speed, and a lateral acceleration in the avoidance steering assist control. For the completion determination of the avoidance steering assist control, thresholds are applied to the steering angular speed, the steering angle, the yaw rate, the vehicle speed, and the lateral acceleration. T. This is when the thresholds of the steering angular speed, the steering angle, the yaw rate, the vehicle speed, and the lateral acceleration are all satisfied.

The selected avoidance steering assist control may use a high-speed fast steering avoidance mode when a vehicle speed threshold is satisfied and a steering angular speed threshold is satisfied, a high-speed slow steering avoidance mode when the vehicle speed threshold is satisfied and the steering angular speed threshold is not satisfied, a low-speed fast steering avoidance mode when the vehicle speed threshold is not satisfied and the steering angular speed threshold is satisfied, and a low-speed slow steering avoidance mode when the vehicle speed threshold is not satisfied and the steering angular speed threshold is not satisfied.

The high-speed fast steering avoidance mode may be divided into a high-speed fast steering mode 1 and a high-speed fast steering mode 2 according to whether there is understeer, the high-speed slow steering avoidance mode is divided into a high-speed slow steering mode 1 and a high-speed slow steering mode 2 according to whether there is the understeer, the low-speed fast steering avoidance mode is divided into a low-speed fast steering mode 1 and a low-speed fast steering mode 2 according to whether there is the understeer, and the low-speed slow steering avoidance mode is divided into a low-speed slow steering mode 1 and a low-speed slow steering mode 2 according to whether there is the understeer.

The stabilization-section integrated chassis control may include performing stability steering assist control selected from the plurality of stage stability steering assist controls, and completing the stability steering assist control relating to the selected stability steering assist control.

In the selected stability steering assist control, front- and rear-wheel damping force control may be performed by an ECS, steering assist control may be performed by an MDPS, braking control may be performed by an ESC, control may be performed by an RWS, and a torque distribution control may be performed by an AWD.

The selected stability steering assist control may use a high-speed fast steering avoidance mode when a vehicle speed threshold is satisfied and a steering angular speed threshold is satisfied, a high-speed slow steering avoidance mode when the vehicle speed threshold is satisfied and the steering angular speed threshold is not satisfied, a low-speed fast steering avoidance mode when the vehicle speed threshold is not satisfied and the steering angular speed threshold is satisfied, and a low-speed slow steering avoidance mode when the vehicle speed threshold is not satisfied and the steering angular speed threshold is not satisfied.

The high-speed fast steering avoidance mode may be divided into a high-speed fast steering mode 1 and a high-speed fast steering mode 2 according to whether there is oversteer, the high-speed slow steering avoidance mode is divided into a high-speed slow steering mode 1 and a high-speed slow steering mode 2 according to whether there is the oversteer, the low-speed fast steering avoidance mode is divided into a low-speed fast steering mode 1 and a low-speed fast steering mode 2 according to whether there is the oversteer, and the low-speed slow steering avoidance mode is divided into a low-speed slow steering mode 1 and a low-speed slow steering mode 2 according to whether there is the oversteer.

The stability steering assist control may perform the vehicle stability determination, based on a steering angle, a steering angular speed, a yaw rate error, and a count time, and the vehicle stability may be when a reference steering angle value of the steering angle, a reference steering angular speed value of the steering angular speed, a reference yaw rate error value of the yaw rate error, and a set time of the count time are all satisfied.

In accordance with various exemplary embodiments of the present invention, a vehicle may include an electronic chassis control system including an ECS, an MDPS, an ESC, an RWS, and an AWD, and an integrated chassis controller performing avoidance steering assist control on the electronic chassis control system to avoid a forward collision risk situation by generating a collision avoidance signal indicative of recognition of the forward collision risk situation and then recognizing a steering attempt, and performing stability steering assist control on the electronic chassis control system when the forward collision risk situation is avoided.

In the avoidance steering assist control and the stability steering assist control, front- and rear-wheel damping force control may be performed by the ECS, steering assist control may be performed by the MDPS, braking control may be performed by the ESC, in-phase control may be performed by the RWS, and a torque distribution control may be performed by the AWD.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a diagram illustrating a principle of integrated chassis control based on stability after avoidance according to the exemplary embodiment of the present invention.

Figure 1:
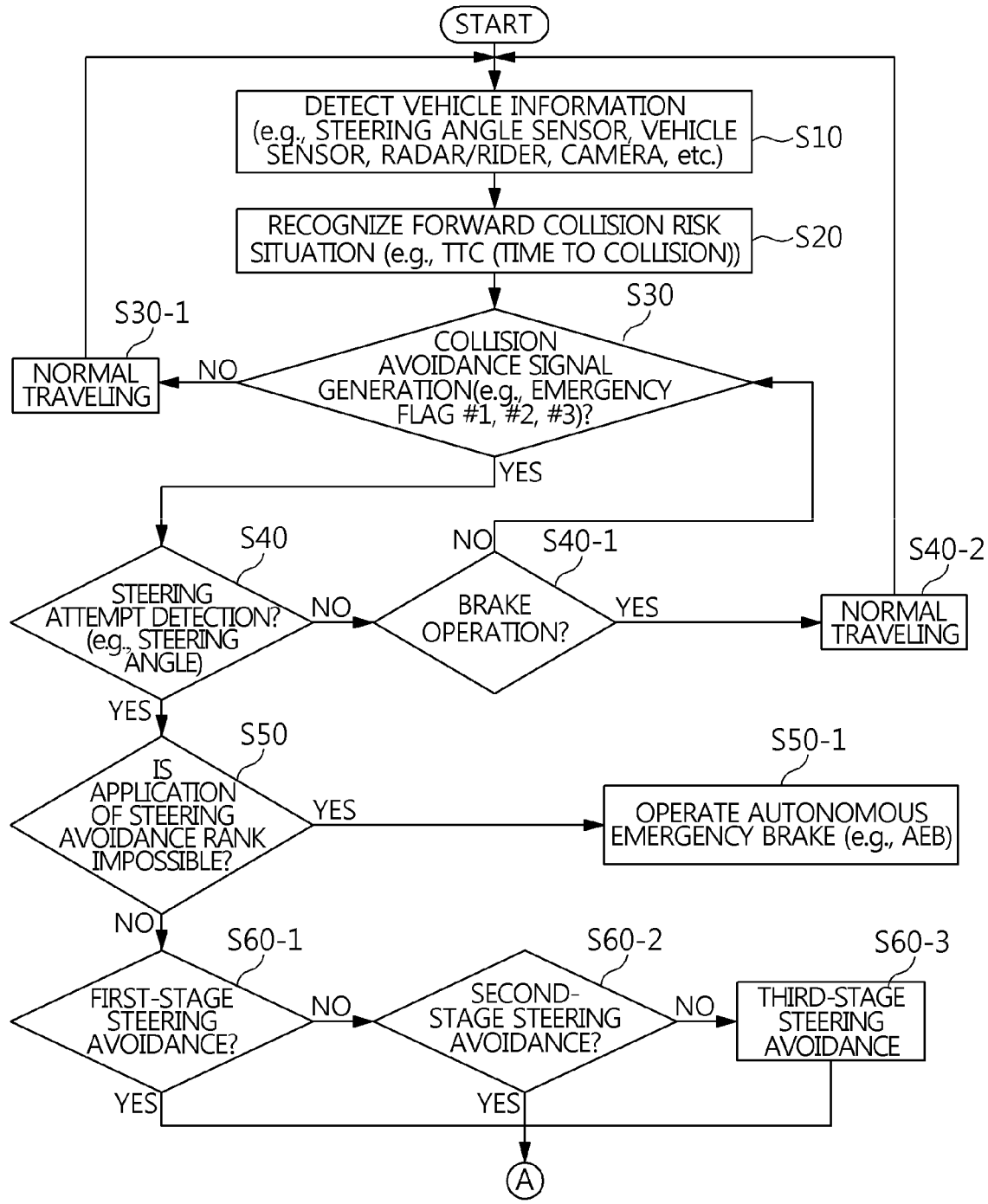
FIG. 1 and FIG. 2 are flowcharts illustrating an integrated chassis control method based on stability after avoidance according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Exemplary embodiments of the present invention will be described below in more detail with reference to the accompanying drawings. The present invention may, however, be embodied in different forms and should not be construed as limited to the exemplary embodiments set forth herein. Rather, these embodiments are provided so that the present disclosure will be thorough and complete, and will fully convey the scope of the present invention to those skilled in the art. Throughout the disclosure, like reference numerals refer to like parts throughout the various figures and embodiments of the present invention.

Referring to 1 and 2, an integrated chassis control method based on stability after avoidance according to an exemplary embodiment of the present invention is performed by stability control after avoidance, and the stability control after avoidance is performed by steering avoidance division control (S10 to S60-3), avoidance steering assist control (S70 to S80), and stability steering assist control (S90 to S110).

For example, in the steering avoidance division control (S10 to S60-3), a steering attempt in a response to collision avoidance signals (e.g., emergency flag #1, #2, and #3) indicative of recognition of a forward collision risk situation is divided into first-, second-, and third-stage steering avoidances, based on a steering angle, a vehicle speed, a yaw rate, a steering angular speed, and a lateral acceleration. In the avoidance steering assist control (S70 to S80), avoidance-section integrated chassis control is performed by first-, second-, and third-stage avoidance steering assist controls matching the respective first-, second-, and third-stage steering avoidances. In the stability steering assist control (S90 to S110), stabilization-section integrated chassis control is performed so that vehicle stability is determined based on a steering angle, a steering angular speed, a yaw rate error, and a duration time according to the completion of the collision avoidance signals (e.g., emergency flag #1, #2, and #3).

As a result, in the integrated chassis control method based on stability after avoidance, a chassis system is controlled in cooperation with an electronic control suspension (ECS) 10, a motor driven power steering (MDPS) 20, an electronic stability control (ESC) 30, a rear wheel steering (RWS) 40, and an all wheel drive (AWD) 50 (see FIG. 4) to maximize avoidance performance when a driver avoids a collision risk situation.

The integrated chassis control method based on stability after avoidance easily performs control integrated with other systems such as an advanced driver assistance system (ADAS) and a forward collision avoidance assist (FCA), considering a vehicle speed and a steering angular speed. Here, the ADAS is a system function that assists safe driving while drowsy or at the time of fog, and the FCA is a system function that autonomously decelerates when a driver does not brake after a warning against collision.

Referring to FIG. 3 illustrating a principle of integrated chassis control based on stability after avoidance, the distance between a vehicle 100 and a forward vehicle 200 traveling in front thereof is determined by an in-vehicle sensor such as a radar sensor, an ultrasonic sensor, or an image sensor, and it is determined that there is a collision risk when the inter-vehicle distance is determined to be within a collision distance. As such, an integrated chassis controller 1-1 performs stability control after avoidance by recognizing the collision risk, and the stability control after avoidance allows the vehicle 100 to be in a stabilization state after avoidance after the ECS 10, the MDPS 20, the ESC 30, the RWS 40, and the AWD 50 are each controlled based on emergency flag #1, #2, and #3, and slow steering (that is, slow counter steer to driver's steering wheels) and fast steering (that is, fast counter steer to driver's steering wheels).

For example, the speed of the vehicle 100 equal to or greater than about 80 kph is set as high speed in the emergency flag #1, #2, and #3. The emergency flag #1 is a warning step, in which it is a situation before 2 seconds to collide when braking is not performed at a high speed and the integrated chassis controller 1-1 recognizes it, and the integrated chassis controller 1-1 generates an alarm such that a driver recognizes the situation. The emergency flag #2 is a partial brake step, in which it is a situation before 1.3 seconds to collide when braking is not performed at a high speed and the integrated chassis controller 1-1 recognizes it, and the integrated chassis controller 1-1 generates a partial brake pressure in advance for immediate response when a driver brakes. The emergency flag #3 is a full brake step, in which it is a situation before 0.9 seconds to collide when braking is not performed at a high speed and the integrated chassis controller 1-1 recognizes it, and the integrated chassis controller 1-1 allows vehicle braking to be actually performed.

For example, in the slow steering, the ECS 10 performs stability control for decreasing the damping force of a front-wheel shock absorber set to be HARD while increasing the damping force of a rear-wheel shock absorber set to be SOFT, the MDPS 20 performs steering control such that a driver has a light steering effort through steering assist control 1, the ESC 30 performs torque vectoring control for reducing an engine torque regarding inherent torque vectoring control, and the AWD 50 performs normal control for implementation of inherent torque distribution suitable to stabilization of yaw behavior by adjusting understeer or oversteer.

For example, in the fast steering, the ECS 10 performs stability control for decreasing the damping force of a front-wheel shock absorber set to be HARD while increasing the damping force of a rear-wheel shock absorber set to be SOFT, the MDPS 20 performs steering control such that a driver has a heavy steering effort through steering assist control 2, the ESC 30 suppresses torque vectoring control for a turning external ring regarding inherent torque vectoring control, and the AWD 50 performs control for increasing inherent torque distribution to front and rear wheels of the vehicle. The present control continues as stability control as in S80-1 when the determination of vehicle stability is not performed in a vehicle stability determination step (S80).

Figure 4:
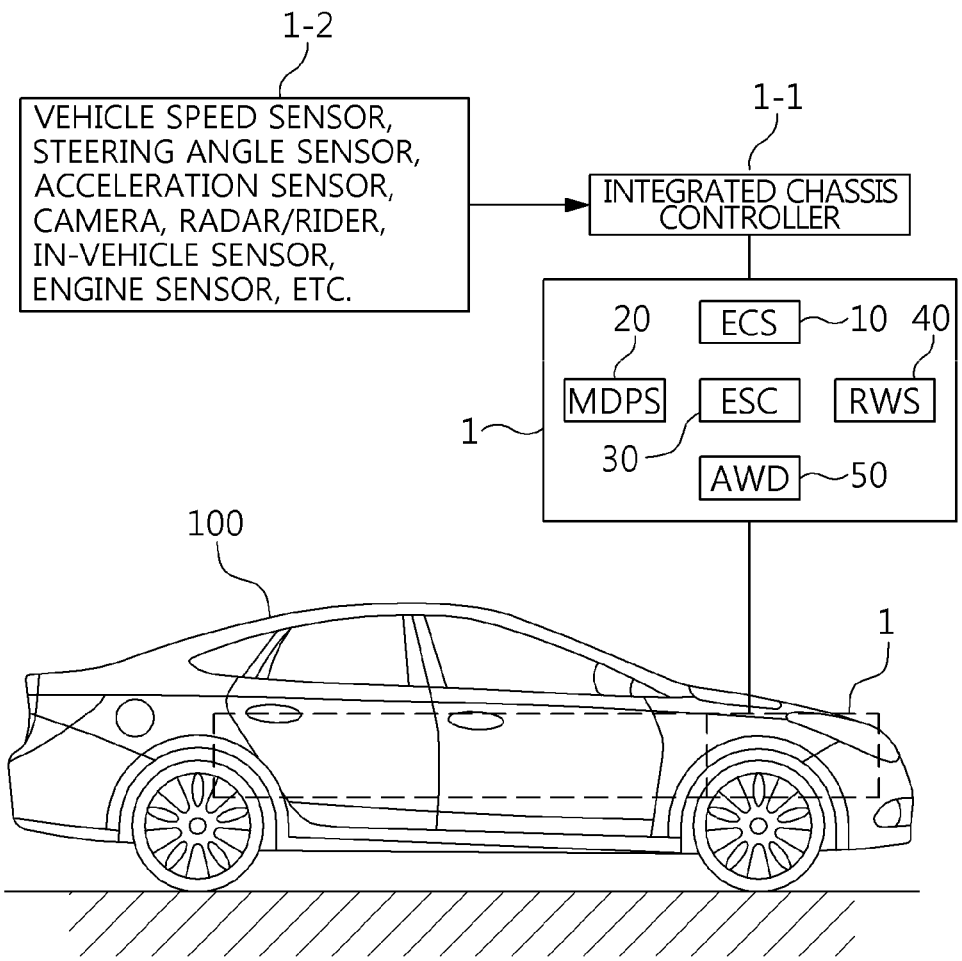
FIG. 4 is a diagram illustrating an example of a vehicle using the integrated chassis control based on stability after avoidance according to the exemplary embodiment of the present invention.
Figure 5:
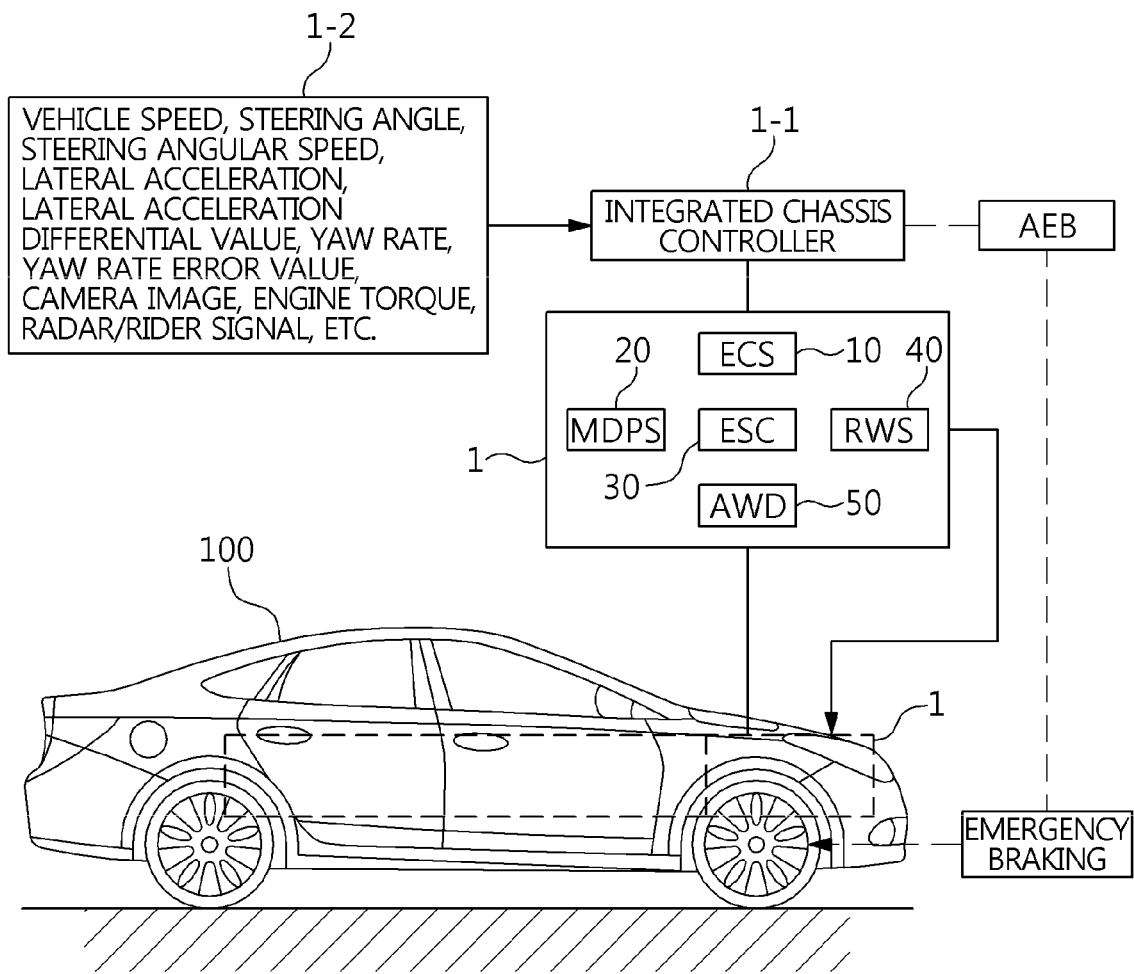
FIG. 5 is a diagram illustrating a state of the vehicle operated by an autonomous emergency brake (AEB) in the integrated chassis control based on stability according to the exemplary embodiment of the present invention.

Meanwhile, FIG. 4 and FIG. 5 illustrate an example of a vehicle 100.

Referring to FIG. 4, the vehicle 100 includes an electronic chassis control system 1 and an integrated chassis controller 1-1.

In detail, the electronic chassis control system 1 includes an ECS 10, an MDPS 20, an ESC 30, an RWS 40, and an AWD 50. For example, the ECS 10 is an electronic suspension system that controls front and rear wheel dampers about the tendency of oversteer/understeer of the vehicle. The MDPS 20 is an electric power steering system that controls assist torque gains about lateral avoidance for improving steering response. The ESC 30 is a vehicle stability system that controls torque vectoring about the tendency of oversteer/understeer. The RWS 40 is a rear wheel steering that steers a rear wheels unlike the front wheel steering. The AWD 50 is a vehicle stability system that controls torque distribution to front and rear wheel about the tendency of oversteer/understeer.

In detail, the integrated chassis controller 1-1 acts as a superior controller that is configured to control the electronic chassis control system 1 by outputting a control signal for each of the ECS 10, the MDPS 20, the ESC 30, the RWS 40, and the AWD 50. To the present end, the integrated chassis controller 1-1 is connected to a sensor data input unit 1-2, and the sensor data input unit 1-2 provides detection values from various sensors disposed in the vehicle 100 to the integrated chassis controller 1-1 as input information. The input information includes a vehicle speed, a steering angle, a steering angular speed, a lateral acceleration, a lateral acceleration differential value, a yaw rate, a yaw rate error value, a camera image signal, an engine torque, a radar/rider distance detection signal, etc., which are respectively detected from a vehicle speed sensor, a steering angle sensor, an acceleration sensor, a camera, a radar/rider, an in-vehicle sensor, and an engine sensor, etc.

Referring to FIG. 5, the vehicle 100 includes an autonomous emergency brake (AEB), and the AEB allows the vehicle 100 to brake with urgency by operating in the steering avoidance division control (S10 to S60-3) of the stability control after avoidance.

Hereinafter, the integrated chassis control method based on stability after avoidance will be described in detain with reference to FIG. 4, FIG. 5, FIG. 6, FIG. 7, FIG. 8, and FIG. 9. Here, the integrated chassis controller 1-1 connected to the sensor data input unit 1-2 is a control subject, and each of the ECS 10, the MDPS 20, the ESC 30, the RWS 40, and the AWD 50 forming the electronic chassis control system 1 is a control target.

The integrated chassis controller 1-1 performs the steering avoidance division control (S10 to S60-3), and the steering avoidance division control (S10 to S60-3) is divided into a vehicle information detection step (S10), a forward collision risk situation recognition step (S20), a collision avoidance signal generation step (S30), a steering attempt detection step (S40), a steering avoidance rank application step (S50), and a steering avoidance division step (S60-1 to S60-3).

Figure 2:
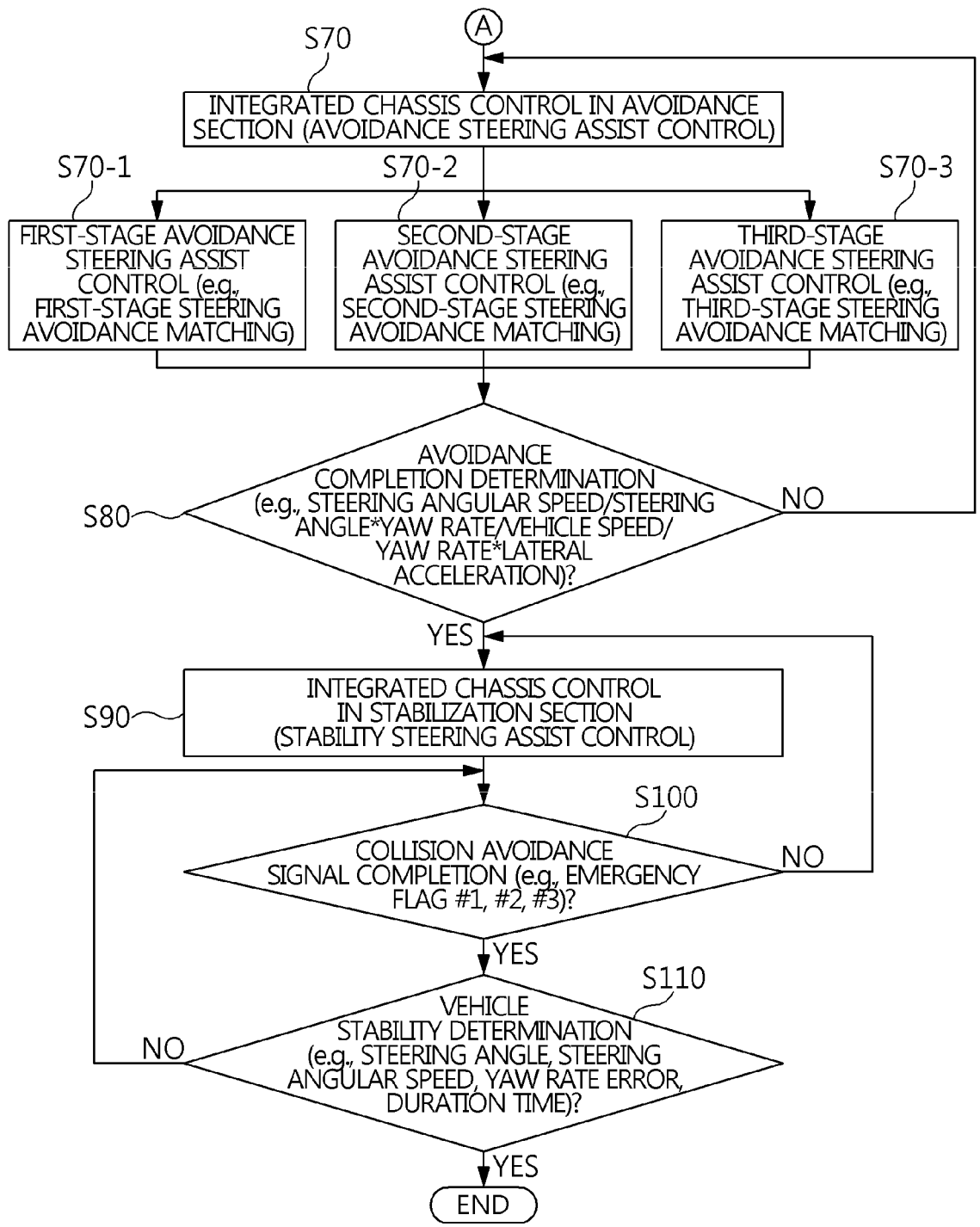

Referring to FIG. 4, the integrated chassis controller 1-1 reads a vehicle speed, a steering angle, a steering angular speed, a lateral acceleration, a lateral acceleration differential value, a yaw rate, a yaw rate error value, a camera image signal, an engine torque, a radar/rider distance detection signal, etc., as input information, recognizes a forward collision risk situation based on the vehicle and the inter-vehicle distance, and then generates collision avoidance signals indicative of emergency #1, #2, and #3 to a time to collision (TTC) rank. On the other hand, when the forward collision risk situation is not recognized, the vehicle is determined to normally travel as in S30-1 so that the process returns to S10 and the control continues to proceed. The emergency #1, #2, and #3 are the same as those defined in FIG. 2.

Next, when one of the emergency #1, #2, and #3 occurs from the forward collision risk situation, the integrated chassis controller 1-1 checks a driver's steering attempt based on the steering angle or the steering angular speed, and divides the set steering avoidance rank based on the steering angle, the vehicle speed, the yaw rate, the steering angular speed, and the lateral acceleration when attempting steering.

When the driver's steering attempt is not performed even though the emergency #1, #2, and #3 occur, the integrated chassis controller 1-1 determines whether the driver brakes in a response to the brake pedal signal as in S40-1. As such, when the driver dose not brake, the integrated chassis controller 1-1 feedbacks the process to S30 to determine whether the emergency #1, #2, and #3 are changed and the control continues to proceed. On the other hand, when the emergency #1, #2, and #3 are released by escaping from the forward collision risk situation by the driver's breaking, the process returns to S10 and the control continues to proceed since the vehicle normally travels as in S40-2.

On the other hand, when the set steering avoidance rank is not divided even though the driver's steering attempt is performed according to the occurrence of the emergency #1, #2, and #3, the integrated chassis controller 1-1 operates the AEB as in S50-1 to escape from the forward collision risk situation by the braking of the emergency brake, releasing the emergency #1, #2, and #3. In the instant case, since the vehicle 100 is stopped, the steering avoidance division control is completed.

As a result, the integrated chassis controller 1-1 divides the steering avoidance rank into a first-stage steering avoidance (S60-1), a second-stage steering avoidance (S60-2), and a third-stage steering avoidance (S60-3). In the instant case, the division of the first-, second-, and third-stage steering avoidances utilizes a difference in size between the steering angle, the vehicle speed, the yaw rate, the steering angular speed, and the lateral acceleration.

Next, the integrated chassis controller 1-1 performs avoidance steering assist control (S70 to S80) based on the first-, second-, and third-stage steering avoidances obtained from the steering avoidance division control (S10 to S60-3). The avoidance steering assist control (S70 to S80) includes a first-stage avoidance steering assist control (S70-1) matched with the first-stage steering avoidance (S60-1), a second-stage avoidance steering assist control (S70-2) matched with the second-stage steering avoidance (S60-2), and a third-stage avoidance steering assist control (S70-3) matched with the third-stage steering avoidance (S60-3), and an avoidance completion determination step (S80) is applied to each thereof to complete the avoidance steering assist control.

The integrated chassis controller 1-1 utilizes the steering angular speed, the steering angle, the yaw rate, the vehicle speed, and the lateral acceleration in the avoidance completion determination, and applies them to the following avoidance completion determination equation: avoidance completion determination: steering angular speed>a & steering angle*yaw rate<b & vehicle speed>d & yaw rate*lateral acceleration>e.

Here, "a" is about 100 deg/s as a steering angular speed threshold, "b" is "0" as a steering angle/yaw rate threshold obtained by multiplying a steering angle by a yaw rate, "d" is about 30 kph as a vehicle speed threshold, and "e" is "0" as a yaw rate/lateral acceleration threshold obtained by multiplying a yaw rate by a lateral acceleration. "&" means "and" considering continuous conditions, and ">, <" is a sign of inequality indicative of the size between two values.

As a result, after the integrated chassis controller 1-1 continuously performs the steering avoidance division control until it is determined that the steering angular speed differs from the steering angular speed threshold (a), the product of the steering angle and the yaw rate is less than 0 (zero), the vehicle speed differs from the vehicle speed threshold (d), and the product of the yaw rate and the lateral acceleration is equal to or more than 0 (zero), the process proceeds to stability steering assist control (S90 to S110).

Hereinafter a high-speed fast steering avoidance mode means a first active steering avoidance mode, a high-speed slow steering avoidance mode means a second active steering avoidance mode, a low-speed fast steering avoidance mode means a third active steering avoidance mode, and a low-speed slow steering avoidance mode means a forth active steering avoidance mode. A high-speed and a low-speed means driving state of vehicle respectively. High and low means a magnitude of vehicle driving velocity respectively.

Figure 6:
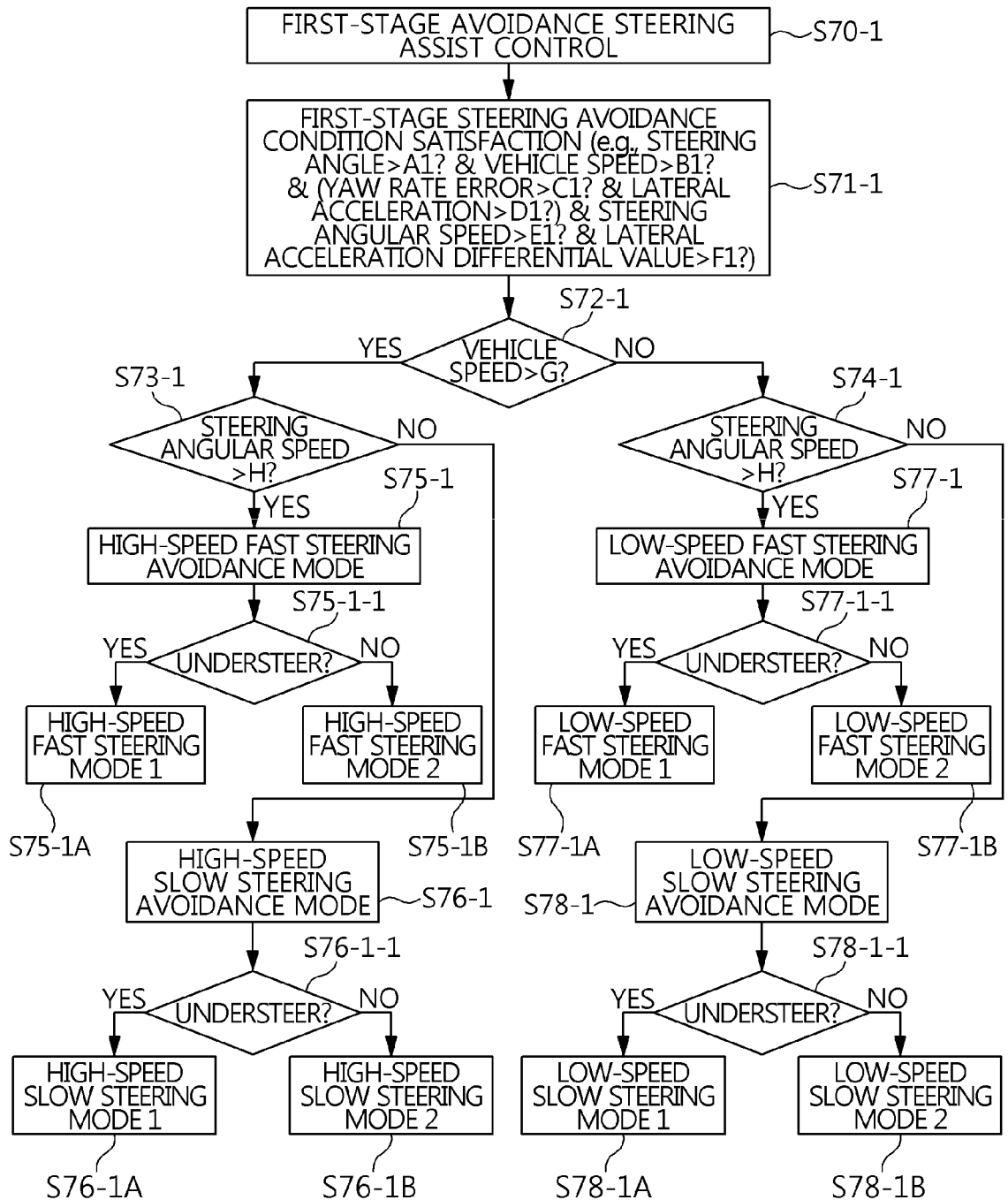
FIG. 6, FIG. 7, and FIG. 8 are flowcharts illustrating first-, second-, and third-stage avoidance steering assist controls of avoidance-section integrated chassis control according to the exemplary embodiment of the present invention.

Referring to FIG. 6, the first-stage avoidance steering assist control (S70-1) is divided into a first-stage steering avoidance condition satisfaction step (S71-1), a high-speed fast steering avoidance mode (S75-1) which is divided into a high-speed fast steering mode 1 (S75-1A) and a high-speed fast steering mode 2 (S75-1B) according to whether there is understeer (S75-1-1) when the vehicle speed is satisfied (S72-1) and the steering angular speed is satisfied (S73-1), a high-speed slow steering avoidance mode (S76-1) which is divided into a high-speed slow steering mode 1 (S76-1A) and a high-speed slow steering mode 2 (S76-1B) according to whether there is understeer (S76-1-1) when the vehicle speed is satisfied (S72-1) and the steering angular speed is not satisfied (S73-1), a low-speed fast steering avoidance mode (S77-1) which is divided into a low-speed fast steering mode 1 (S77-1A) and a low-speed fast steering mode 2 (S77-1B) according to whether there is understeer (S77-1-1) when the vehicle speed is not satisfied (S72-1) and the steering angular speed is satisfied (S74-1), and a low-speed slow steering avoidance mode (S78-1) which is divided into a low-speed slow steering mode 1 (S78-1A) and a low-speed slow steering mode 2 (S78-1B) according to whether there is understeer (S78-1-1) when the vehicle speed is not satisfied (S72-1) and the steering angular speed is not satisfied (S74-1).

The integrated chassis controller 1-1 utilizes the steering angle, the vehicle speed, the yaw rate error, the lateral acceleration, and the lateral acceleration differential value in the first-stage steering avoidance condition satisfaction determination, and applies them to the following first-stage steering avoidance condition satisfaction equation:

first-stage steering avoidance condition satisfaction: steering angle>$A1$ & vehicle speed>$B1$ & (yaw rate error>$C1$ & lateral acceleration>$D1$) & steering angular speed>$E1$ & lateral acceleration differential value>$F1$.

Here, "A1" is about 10 deg/s as a steering angle threshold, "B1" is about 30 kph as a vehicle speed threshold, "C1" is 0.87 as a yaw rate error threshold, "D1" is "0" as a lateral acceleration threshold, "E1" is about 50 deg/s as a steering angular speed threshold, and "F1" is 2 as a lateral acceleration differential value.

As a result, when it is determined that the steering angle is equal to or greater than the steering angle threshold (A1), the vehicle speed is equal to or greater than the vehicle speed threshold (B1), the yaw rate error is equal to or greater than 0 (zero), the lateral acceleration is equal to or greater than 0 (zero), the steering angular speed is equal to or greater than the steering angular speed threshold (E1), and the lateral acceleration differential value is equal to or greater than 2, the integrated chassis controller 1-1 begins the first-stage avoidance steering assist control.

The integrated chassis controller 1-1 applies the vehicle speed and the steering angular speed to the following condition satisfaction equation:

vehicle speed condition satisfaction: vehicle speed>$G$; and steering angular speed condition satisfaction: steering angular speed>$H$, where "$G$" is about 90 kph as a vehicle speed threshold, and "$H$" is about 250 deg/s as a steering angular speed threshold.

As a result, the integrated chassis controller 1-1 determines that a vehicle speed equal to or greater than about 90 kph and a steering angular speed equal to or greater than about 250 deg/s satisfy the conditions.

Referring to FIG. 4, the integrated chassis controller 1-1 outputs a control signal to each of the ECS 10, the MDPS 20, the ESC 30, the RWS 40, and the AWD 50 so that each operation of the ECS 10, the MDPS 20, the ESC 30, the RWS 40, and the AWD 50 for the high-speed fast steering mode 1/2, the high-speed slow steering mode 1/2, the low-speed fast steering mode 1/2, and the low-speed slow steering mode 1/2 is controlled as follows.

In the high-speed fast steering mode 1 (S75-1A), the operation of the ECS 10 is controlled by front-wheel HARD/rear-wheel SOFT, the operation of the MDPS 20 is controlled by steering assist control 2, the operation of the ESC 30 is controlled by turning internal-rear wheel braking, the operation of the RWS 40 is controlled by weak in-phase control, and the operation of the AWD 50 is controlled by torque distribution suppression.

In the high-speed fast steering mode 2 (S75-1B), the operation of the ESC 30 is controlled without turning internal-rear wheel braking, the operation of the ECS 10 is controlled without front-wheel HARD/rear-wheel SOFT, the operation of the MDPS 20 is controlled by steering assist control 2, the operation of the RWS 40 is controlled by weak in-phase control, and the operation of the AWD 50 is controlled by torque distribution suppression.

In the high-speed slow steering mode 1 (S76-1A), the operation of the ECS 10 is controlled by front-wheel SOFT/rear-wheel HARD, the operation of the MDPS 20 is controlled by steering assist control 1, the operation of the ESC 30 is controlled by turning internal-rear wheel braking, the operation of the RWS 40 is controlled by weak in-phase control, and the operation of the AWD 50 is controlled by normal control.

In the high-speed slow steering mode 2 (S76-1B), the operation of the ESC 30 is controlled without turning internal-rear wheel braking, the operation of the ECS 10 is controlled by front-wheel SOFT/rear-wheel HARD, the operation of the MDPS 20 is controlled by steering assist control 1, the operation of the ESC 30 is controlled by turning internal-rear wheel braking, the operation of the RWS 40 is controlled by weak in-phase control, and the operation of the AWD 50 is controlled by normal control.

In the low-speed fast steering mode 1 (S77-1A), the operation of the ECS 10 is controlled without front-wheel HARD/rear-wheel HARD, the operation of the MDPS 20 is controlled by steering assist control 2, the operation of the ESC 30 is controlled by turning internal-rear wheel braking, the operation of the RWS 40 is controlled by strong in-phase control, and the operation of the AWD 50 is controlled by strong negative phase control.

In the low-speed fast steering mode 2 (S77-1B), the operation of the ESC 30 is controlled without turning internal-rear wheel braking, the operation of the ECS 10 is controlled without front-wheel HARD/rear-wheel HARD, the operation of the MDPS 20 is controlled by steering assist control 2, the operation of the RWS 40 is controlled by strong negative phase control, and the operation of the AWD 50 is controlled by torque distribution suppression.

In the low-speed slow steering mode 1 (S78-1A), the operation of the ECS 10 is controlled without front-wheel HARD/rear-wheel HARD, the operation of the MDPS 20 is controlled by steering assist control 1, the operation of the ESC 30 is controlled by turning internal-rear wheel braking, the operation of the RWS 40 is controlled by strong negative phase control, and the operation of the AWD 50 is controlled by normal control.

In the low-speed slow steering mode 2 (S78-1B), the operation of the ESC 30 is controlled without turning internal-rear wheel braking, the operation of the ECS 10 is controlled without front-wheel HARD/rear-wheel HARD, the operation of the MDPS 20 is controlled by steering assist control 1, the operation of the RWS 40 is controlled by strong negative phase control, and the operation of the AWD 50 is controlled by normal control.

Meanwhile, the integrated chassis controller 1-1 applies the same method as the first-stage avoidance steering assist control to the second-stage avoidance steering assist control and the third-stage avoidance steering assist control. Therefore, the processes of the second-stage avoidance steering assist control in FIG. 7 and the third-stage avoidance steering assist control in FIG. 8 are the same as that of the first-stage avoidance steering assist control in FIG. 6.

However, since the second-stage avoidance steering assist control differs from the first-stage avoidance steering assist control in terms of application conditions, the following second-stage steering avoidance condition satisfaction equation for the first-stage steering avoidance condition satisfaction (S71-2) is applied to the second-stage avoidance steering assist control:

second-stage steering avoidance condition satisfaction: steering angle>$A2$ & vehicle speed>$B2$ & (yaw rate error>$C2$ & lateral acceleration>$D2$) & steering angular speed>$E2$ & lateral acceleration differential value>$F2$.

The second-stage steering avoidance condition satisfaction differs from the first-stage stage steering avoidance condition satisfaction in that the steering angle threshold (A2), the vehicle speed threshold (B2), and the steering angular speed threshold (E2) are somewhat large. The yaw rate error threshold (C2) and the lateral acceleration (D2) are equal to those of the first-stage steering avoidance condition satisfaction.

Furthermore, since the third-stage avoidance steering assist control differs from the first- and second-stage avoidance steering assist controls in terms of application conditions, the following third-stage steering avoidance condition satisfaction equation for the third-stage steering avoidance condition satisfaction (S71-3) is applied to the third-stage avoidance steering assist control:

third-stage steering avoidance condition satisfaction: steering angle>$A3$ & vehicle speed>$B3$ & (yaw rate error>$C3$ & lateral acceleration>$D3$) & steering angular speed>$E3$ & lateral acceleration differential value>$F3$.

The third-stage steering avoidance condition satisfaction differs from the first- and second-stage steering avoidance condition satisfactions in that the steering angle threshold (A3), the vehicle speed threshold (B3), and the steering angular speed threshold (E3) are larger. The yaw rate error threshold (C3) and the lateral acceleration (D3) are equal to those of the first- and second-stage steering avoidance condition satisfactions.

For the operation control of the MDPS 20 in the second- and third-stage avoidance steering assist controls, the steering assist control 1 is replaced with the steering assist control 2 and the steering assist control 2 is changed to steering assist control 3 for more rapid execution.

The following Table 1 illustrates a state of operation control of each of the ECS 10, the MDPS 20, the ESC 30, the RWS 40, and the AWD 50 for the first-, second-, and third-stage steering avoidance control:

TABLE 1

| Avoidance Section | Chassis System Control | | | | |
|---|---|---|---|---|---|
| | ECS | MDPS | ESC | RWS | AWD |
| Low-speed slow steering control | Front wheel: Hard Rear wheel: Hard | Steering assist control 1 (Max 1.5 Nm) | Control X | Strong negative phase control | Normal control |
| Low-speed fast steering control | Front wheel: Hard Rear wheel: Hard | Steering assist control 2 (Max 3 Nm) | Control X | Strong negative phase control | Torque distribution suppression |
| high-speed slow steering control | Front wheel: Soft Rear wheel: Hard | Steering assist control 1 (Max 1.5 Nm) | Control X | Weak in-phase control | Normal control |
| high-speed fast steering control | Front wheel: Hard Rear wheel: Soft | Steering assist control 2 (Max 3 Nm) | Turning internal-rear wheel braking (Max 30 bar) | Weak in-phase control | Torque distribution suppression |

Referring to FIG. 1 and FIG. 2 again, the integrated chassis controller 1-1 performs stability steering assist control (S90 to S110), and the stability steering assist control (S90 to S110) includes a stabilization-section integrated chassis control step under the stability steering assist control (S90), a collision avoidance signal completion step through the release recognition of the generated one of the emergency flag #1, #2, and #3 (S100), and a completion step according to the vehicle stability determination (S110).

The integrated chassis controller 1-1 divides the stability steering assist control (S90 to S110) into a stability steering assist control entry step (S90), a high-speed fast steering avoidance mode (S95) which is divided into a high-speed fast steering mode 1 (S95A) and a high-speed fast steering mode 2 (S95B) according to whether there is oversteer (S95-1) when the vehicle speed is satisfied (S92) and the steering angular speed is satisfied (S93), a high-speed slow steering avoidance mode (S96) which is divided into a high-speed slow steering mode 1 (S96A) and a high-speed slow steering mode 2 (S96B) according to whether there is oversteer (S96-1) when the vehicle speed is satisfied (S92) and the steering angular speed is not satisfied (S93), a low-speed fast steering avoidance mode (S97) which is divided into a low-speed fast steering mode 1 (S97A) and a low-speed fast steering mode 2 (S97B) according to whether there is oversteer (S97-1) when the vehicle speed is not satisfied (S92) and the steering angular speed is satisfied (S94), and a low-speed slow steering avoidance mode (S98) which is divided into a low-speed slow steering mode 1 (S98A) and a low-speed slow steering mode 2 (S98B) according to whether there is oversteer (S98-1) when the vehicle speed is not satisfied (S92) and the steering angular speed is not satisfied (S94).

The integrated chassis controller 1-1 utilizes the same vehicle speed condition satisfaction equation and steering angular speed condition satisfaction equation as the first-, second-, and third-stage avoidance steering assist controls by applying the vehicle speed and the steering angular speed to the following condition satisfaction equation:

vehicle speed condition satisfaction: vehicle speed>$G$; and steering angular speed condition satisfaction: steering angular speed>$H$.

As a result, the integrated chassis controller 1-1 determines that a vehicle speed equal to or greater than about 90 kph and a steering angular speed equal to or greater than about 250 deg/s satisfy the conditions.

Therefore, the integrated chassis controller 1-1 applies the same process and operation control as each of the first-stage avoidance steering assist control (S70-1), the second-stage avoidance steering assist control (S70-2), and the third-stage avoidance steering assist control (S70-3) of the avoidance steering assist control (S70 to S80) to the stability steering assist control (S90).

However, the stability steering assist control (S90) differs from the avoidance steering assist control (S70 to S80) focusing on the resolution of the understeer in that it focuses on the resolution of the oversteer. The reason is because the avoidance steering assist control (S70 to S80) is performed to gradually escape from the vehicle lane for avoidance of the forward vehicle 200 whereas the stability steering assist control (S90) is performed to return to the original lane for stabilization of the vehicle.

Figure 7:
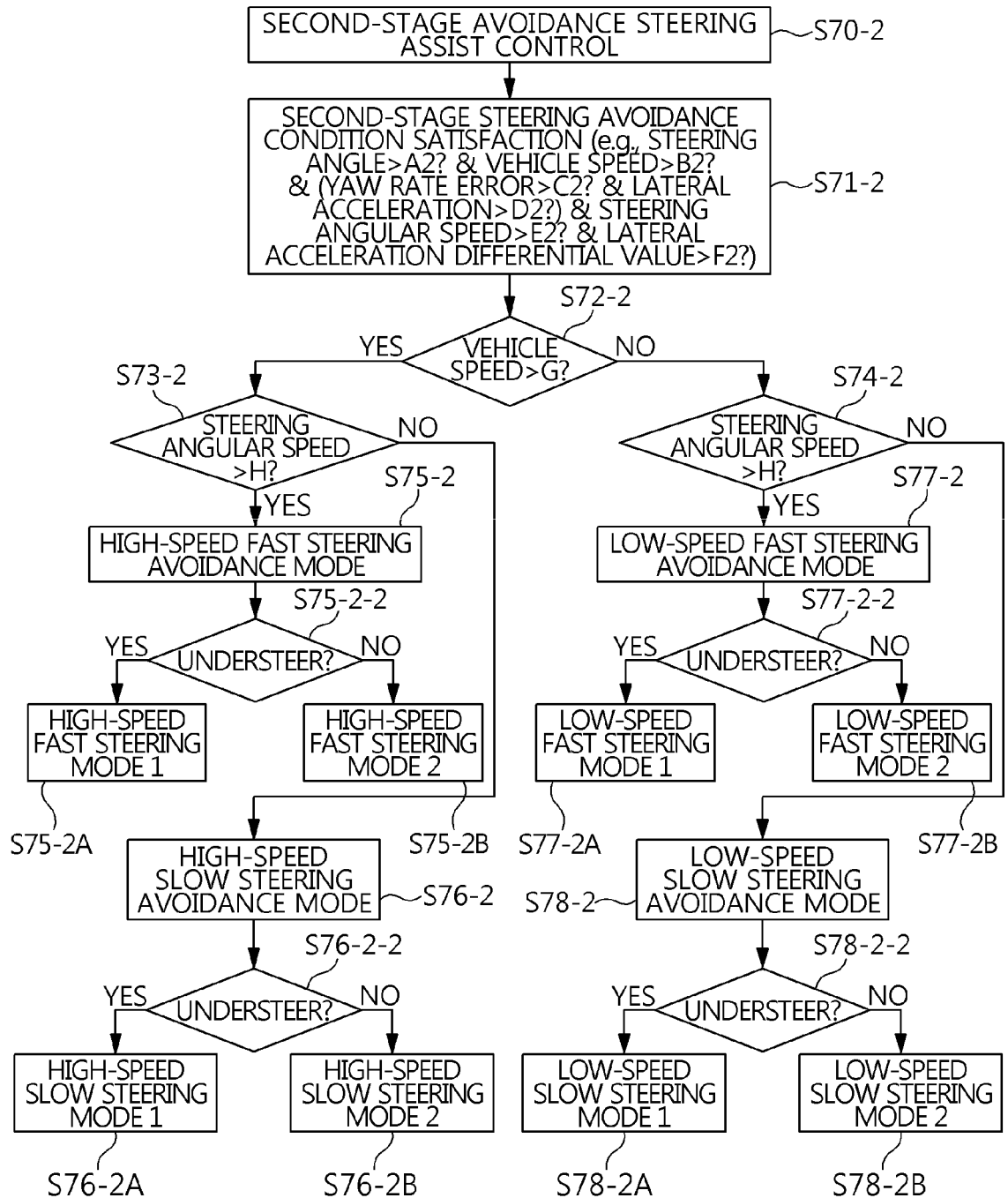
Figure 8:
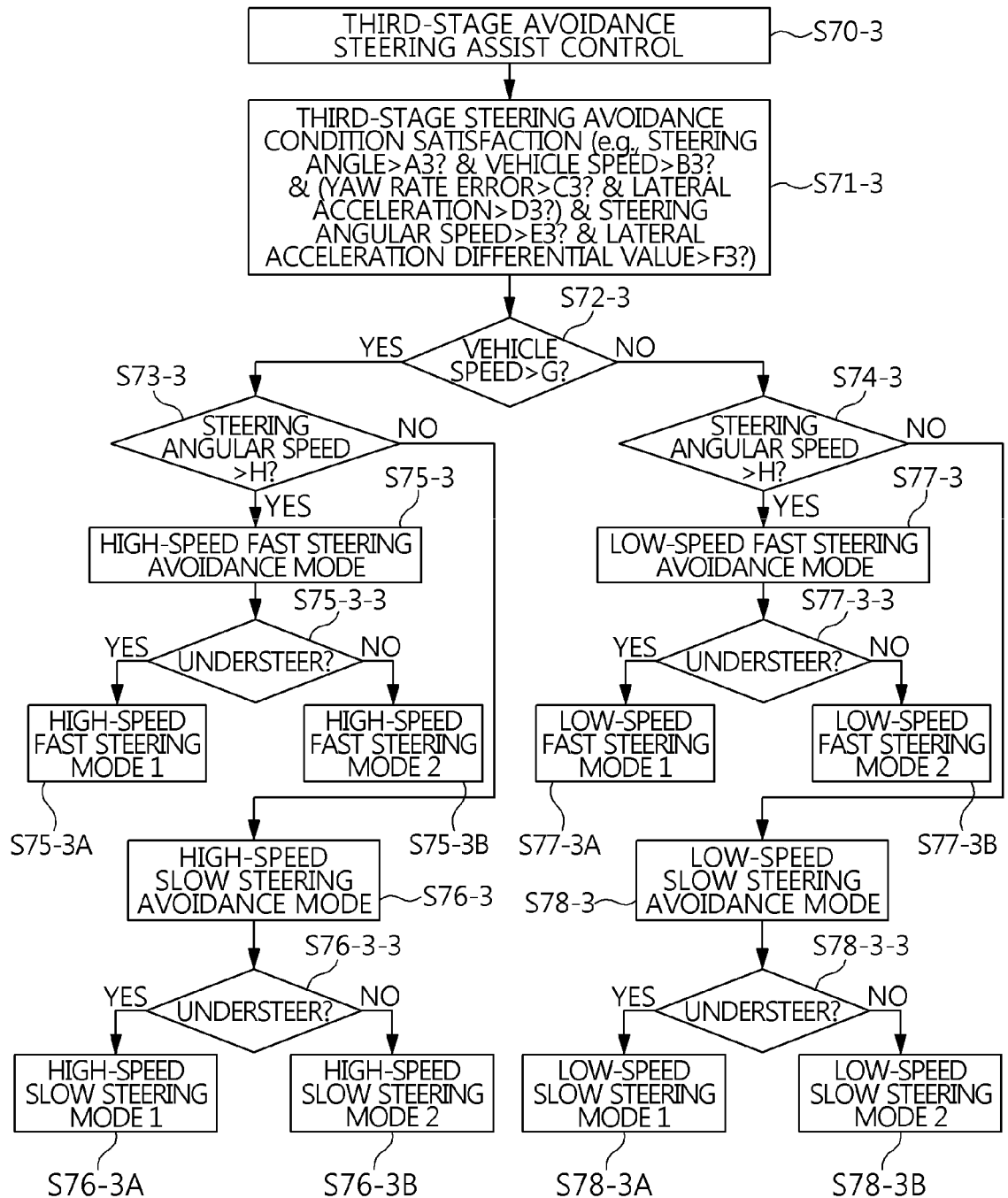
Figure 9:
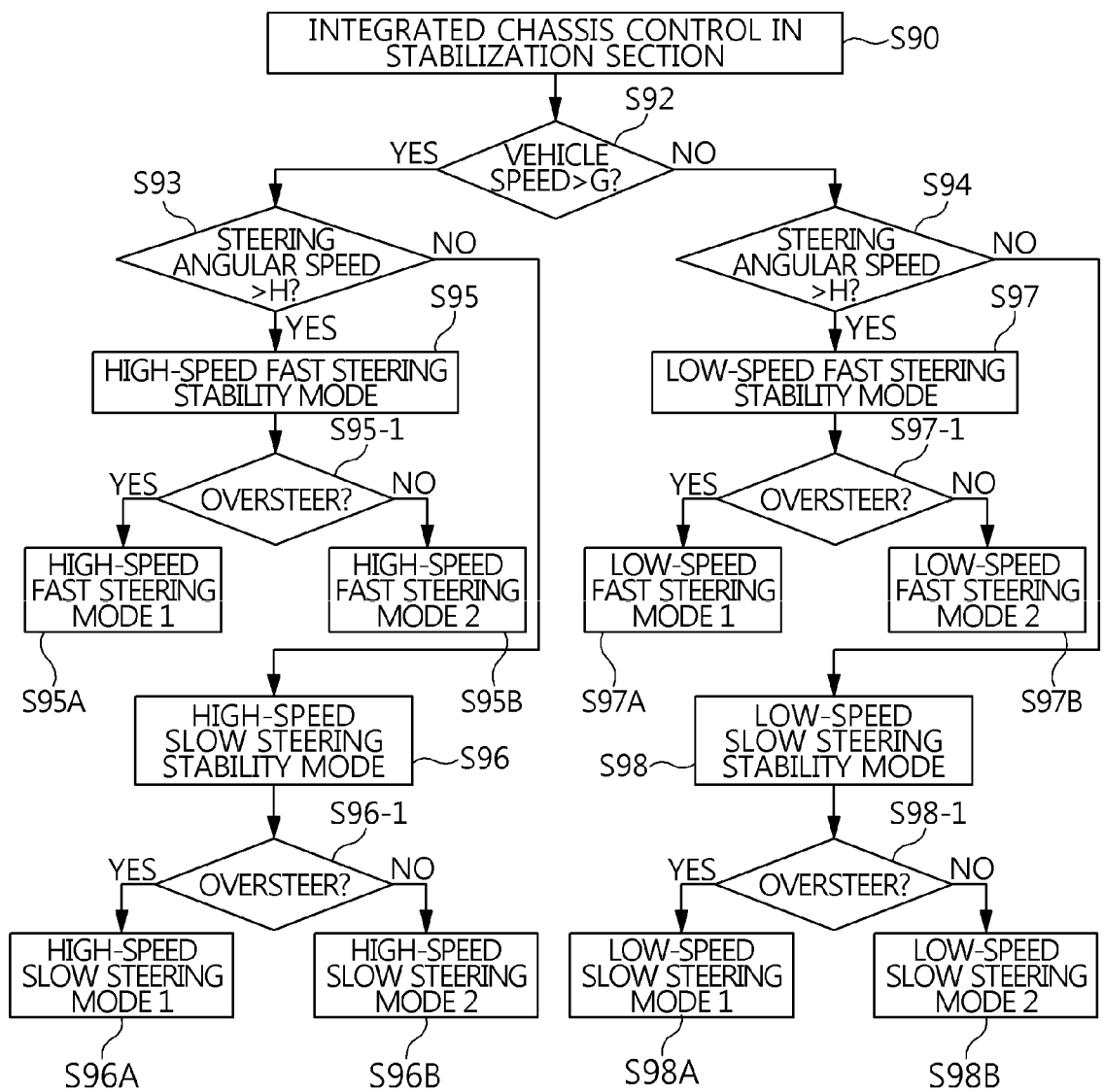
FIG. 9 is a flowchart illustrating stability steering assist control of stabilization-section integrated chassis control according to the exemplary embodiment of the present invention.

Therefore, the integrated chassis controller 1-1 changes the first-stage avoidance steering assist control (S70-1) in FIG. 6 to the first-stage stability assist control, changes the second-stage avoidance steering assist control (S70-2) in FIG. 7 to the second-stage stability assist control, and changes the third-stage avoidance steering assist control (S70-3) in FIG. 8 to the third-stage stability assist control.

However, the integrated chassis controller 1-1 applies the following vehicle stability determination equation to the vehicle stability determination:

vehicle stability determination: steering angle<$f$ & steering angular speed<$g$ & yaw rate error<$h$ & certain time>$i$.

Here, "f" is a reference steering angle value, "g" is a reference steering angular speed value, "h" is a reference yaw rate error value, and "i" is a reference count time. The reference values are set under the condition that the posture stability of the vehicle 100 is not controlled by operation control of each of the ECS 10, the MDPS 20, the ESC 30, the RWS 40, and the AWD 50. The count time is about 3 seconds.

As a result, the integrated chassis controller 1-1 determines that the vehicle is stabilized when the steering angle is less than the reference steering angle value (f), the steering angular speed is less than the reference steering angular speed value (g), the yaw rate error is less than the reference yaw rate error value (h), and the count time is equal to or greater than about 3 seconds, and completes the control.

The following Table 2 illustrates a state of operation control of each of the ECS 10, the MDPS 20, the ESC 30, the RWS 40, and the AWD 50 for the stability steering avoidance control:

TABLE 2

| Avoidance Section | Chassis System Control | | | | |
|---|---|---|---|---|---|
| | ECS | MDPS | ESC | RWS | AWD |
| Low-speed slow steering control | Front wheel: Hard Rear wheel: Hard | Stability assist control 1 (Max 3 Nm) | Control X | Negative phase control | Normal control |
| Low-speed fast steering control | Front wheel: Hard Rear wheel: Hard | Stability assist control 1 (Max 3 Nm) | Control X | Negative phase control | Normal control |
| high-speed slow steering control | Front wheel: Hard Rear wheel: Soft | Stability assist control 1 (Max 3 Nm) | Control X | Strong in-phase control | Normal control |
| high-speed fast steering control | Front wheel: Hard Rear wheel: Soft | Stability assist control 1 (Max 3 Nm) | Turning outer-front wheel braking (Max 30 bar) | Strong in-phase control | Normal control |

As described above, the integrated chassis control method based on stability after avoidance applied to the vehicle 100 according the exemplary embodiment of the present invention performs the avoidance steering assist control on the electronic chassis control system 1 to avoid the forward collision situation by generating the collision avoidance signals indicative of recognition of the forward collision risk situation and then recognizing the steering attempt, and performs the stability steering assist control on the electronic chassis control system 1 when the forward collision situation is avoided, rendering the lane keeping performance effective after the forward collision avoidance by cooperation control with the chassis system between the ECS 10, the MDPS 20, the ESC 30, the RWS 40, and the AWD 50 based on the driver's avoidance steering and the vehicle speed in the case of detecting the forward collision risk. Thus, the vehicle stability control is significantly improved.

As is apparent from the above description, the vehicle of the present invention has the following action and effect by performing the integrated chassis control based on avoidance information.

Firstly, it is possible to establish an effective avoidance control strategy by the driver's avoidance intention and the integrated chassis control based on the vehicle speed and the steering angular speed while the vehicle travels. Secondly, it is possible to secure vehicle agility to match the driver's avoidance intention in the collision risk situation and simultaneously secure vehicle stability by keeping the traveling lane after the avoidance, considering the low to high vehicle speed and the steering angular speed. Thirdly, it is possible to improve riding and handling (R&H) performance while optimizing the vehicle stability in the process before and after the avoidance by the integrated chassis control. Fourthly, it is possible to maximize avoidance performance by creating the synergy effect of the system by the integrated chassis control in cooperation with the ECS, the ESC, the MDPS, the AWD, and the RWS. Fifthly, it is possible to easily perform the control integrated with other systems such as the advanced driver assistance system (ADAS) and the forward collision avoidance assist (FCA), easily performs control integrated with other systems such as an advanced driver assistance system (ADAS) and a forward collision avoidance assist (FCA) in the process before and after the avoidance by performing the integrated chassis control based on avoidance steering information.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An integrated chassis control method comprising:
   stability control after avoidance performing stability steering assist control after avoiding a forward collision situation of a vehicle by avoidance steering assist control when the forward collision situation is verified by an integrated chassis controller,
   wherein the stability control after avoidance includes:
      steering avoidance division control for dividing the avoidance steering assist control into a plurality of stage steering avoidances when recognizing a forward collision risk situation;
      avoidance-section integrated chassis control including a plurality of stage avoidance steering assist controls matching the plurality of stage steering avoidances, respectively; and
      stabilization-section integrated chassis control including a plurality of stage stability steering assist controls matching the plurality of stage avoidance steering assist controls, respectively,
   wherein the avoidance-section integrated chassis control further includes:
      performing avoidance steering assist control selected from the plurality of stage avoidance steering assist controls; and
      completing the avoidance steering assist control relating to the selected avoidance steering assist control, and
   wherein the selected avoidance steering assist control utilizes a first active steering avoidance mode when a vehicle speed threshold is satisfied and a steering angular speed threshold is satisfied,
   wherein the selected avoidance steering assist control utilizes a second active steering avoidance mode when the vehicle speed threshold is satisfied and the steering angular speed threshold is not satisfied,
   wherein the selected avoidance steering assist control utilizes a third active steering avoidance mode when the vehicle speed threshold is not satisfied and the steering angular speed threshold is satisfied, and
   wherein the selected avoidance steering assist control utilizes a forth active steering avoidance mode when the vehicle speed threshold is not satisfied and the steering angular speed threshold is not satisfied.

2. The integrated chassis control method of claim 1, wherein the stability control after avoidance is reflected when driver's steering is performed.

3. The integrated chassis control method of claim 1, wherein the steering avoidance division control is performed by detecting vehicle information, determining the forward collision risk situation from the vehicle information, detecting a steering wheel operation in the forward collision risk situation, and dividing the plurality of stage steering avoidances by a steering avoidance rank when the steering wheel operation is detected.

4. The integrated chassis control method of claim 3, wherein the forward collision risk situation is determined based on a steering angular speed, a steering angle, a yaw rate, a vehicle speed, and a lateral acceleration of the vehicle.

5. The integrated chassis control method of claim 3, wherein, when the steering wheel operation is detected, a collision avoidance signal is generated by generation of an emergency flag, and the plurality of stage steering avoidances are divided by the emergency flag.

6. The integrated chassis control method of claim 1, wherein, in the selected avoidance steering assist control, front- and rear-wheel damping force control is performed by an electronic control suspension (ECS), steering assist control is performed by a motor driven power steering (MDPS), braking control is performed by an electronic stability control (ESC), in-phase control is performed by a rear wheel steering (RWS), and a torque distribution control is performed by an all wheel drive (AWD).

7. The integrated chassis control method of claim 6, wherein completion of the avoidance steering assist control is determined based on a steering angular speed, a steering angle, a yaw rate, a vehicle speed, and a lateral acceleration.

8. The integrated chassis control method of claim 1,
wherein the first active steering avoidance mode is divided into a first active fast steering mode 1 and a first active steering mode 2 according to whether there is understeer,
wherein the second active steering avoidance mode is divided into a second active steering mode 1 and a second active steering mode 2 according to whether there is the understeer,
wherein the third active steering avoidance mode is divided into a third active steering mode 1 and a third active steering mode 2 according to whether there is the understeer, and
wherein the forth active steering avoidance mode is divided into a forth active mode 1 and a forth active steering mode 2 according to whether there is the understeer.

9. The integrated chassis control method of claim 8,
wherein the first active steering avoidance mode is divided into the first active steering mode 1 when there is understeer and the first active steering mode 2 when there is no understeer,
wherein the second active steering avoidance mode is divided into the second active steering mode 1 when there is understeer and the second active steering mode 2 when there is no understeer,
wherein the third active steering avoidance mode is divided into the third active steering mode 1 when there is understeer and the third active steering mode 2 when there is no understeer, and
wherein the forth active steering avoidance mode is divided into the forth active steering mode 1 when there is understeer and the forth active steering mode 2 when there is no understeer.

10. The integrated chassis control method of claim 1, wherein the stabilization-section integrated chassis control includes performing stability steering assist control selected from the plurality of stage stability steering assist controls, and completing the stability steering assist control relating to the selected stability steering assist control.

11. The integrated chassis control method of claim 10, wherein, in the selected stability steering assist control, front- and rear-wheel damping force control is performed by an electronic control suspension (ECS), steering assist control is performed by a motor driven power steering (MDPS), braking control is performed by an electronic stability control (ESC), in-phase control is performed by a rear wheel steering (RWS), and a torque distribution control is performed by an all wheel drive (AWD).

12. The integrated chassis control method of claim 10,
wherein the selected stability steering assist control utilizes the first active steering avoidance mode when a vehicle speed threshold is satisfied and a steering angular speed threshold is satisfied,
wherein the selected stability steering assist control utilizes the second active steering avoidance mode when the vehicle speed threshold is satisfied and the steering angular speed threshold is not satisfied,
wherein the selected stability steering assist control utilizes the third active steering avoidance mode when the vehicle speed threshold is not satisfied and the steering angular speed threshold is satisfied, and
wherein the selected stability steering assist control utilizes the forth active steering avoidance mode when the vehicle speed threshold is not satisfied and the steering angular speed threshold is not satisfied.

13. The integrated chassis control method of claim 12,
wherein the first active steering avoidance mode is divided into a first active steering mode 1 and a first active steering mode 2 according to whether there is oversteer,
wherein the second active steering avoidance mode is divided into a second active steering mode 1 and a second active steering mode 2 according to whether there is the oversteer,
wherein the third active steering avoidance mode is divided into a third active steering mode 1 and a third active steering mode 2 according to whether there is the oversteer, and
wherein the forth active steering avoidance mode is divided into a forth active steering mode 1 and a forth active steering mode 2 according to whether there is the oversteer.

14. The integrated chassis control method of claim 13,
wherein the first active steering avoidance mode is divided into the first active steering mode 1 when there is oversteer, and the first active steering mode 2 when there is no oversteer,
wherein the second active steering avoidance mode is divided into the second active steering mode 1 when there is oversteer, and the second active steering mode 2 when there is no oversteer,
wherein the third active steering avoidance mode is divided into the third active steering mode 1 when there is oversteer, and the third active steering mode 2 when there is no oversteer, and
wherein the forth active steering avoidance mode is divided into the forth active steering mode 1 when there is oversteer, and the forth active steering mode 2 when there is no oversteer.

15. The integrated chassis control method of claim 10, wherein the stability steering assist control performs after a vehicle stability determination in which, a reference steering angle value of a steering angle, a reference steering angular speed value of a steering angular speed, a reference yaw rate error value of a yaw rate error, and a set time of a count time are all satisfied.

16. A vehicle comprising:
an electronic chassis control system including one of an electronic control suspension (ECS), a motor driven power steering (MDPS), an electronic stability control (ESC), a rear wheel steering (RWS), and an all wheel drive (AWD); and
the integrated chassis controller configured to execute the method of claim 1, wherein the integrated chassis controller is configured for performing the avoidance steering assist control on the electronic chassis control system to avoid the forward collision risk situation by generating a collision avoidance signal indicative of recognition of the forward collision risk situation and then recognizing a steering attempt, and performing the stability steering assist control on the electronic chassis control system when the forward collision risk situation is avoided.

17. The vehicle of claim 16, wherein, in the avoidance steering assist control and the stability steering assist control, front- and rear-wheel damping force control is performed by an electronic control suspension (ECS), steering assist control is performed by a motor driven power steering (MDPS), braking control is performed by the ESC, in-phase control is performed by a rear wheel steering (RWS), and a torque distribution control is performed by an all wheel drive (AWD).

* * * * *